United States Patent
Liu et al.

(10) Patent No.: US 11,451,967 B2
(45) Date of Patent: Sep. 20, 2022

(54) TECHNIQUES FOR BANDWIDTH PART RESOURCE BLOCK OFFSET HOPPING

(71) Applicant: QUALCOMM Incorporated, San Diego, CA (US)

(72) Inventors: Chih-Hao Liu, San Diego, CA (US); Xiaoxia Zhang, San Diego, CA (US); Jing Sun, San Diego, CA (US); Yisheng Xue, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 88 days.

(21) Appl. No.: 16/864,898

(22) Filed: May 1, 2020

(65) Prior Publication Data

US 2021/0345122 A1 Nov. 4, 2021

(51) Int. Cl.
| | |
|---|---|
| *H04W 16/14* | (2009.01) |
| *H04W 76/11* | (2018.01) |
| *H04B 1/7143* | (2011.01) |
| *H04W 56/00* | (2009.01) |
| *H04W 72/04* | (2009.01) |

(52) U.S. Cl.
CPC .......... *H04W 16/14* (2013.01); *H04B 1/7143* (2013.01); *H04W 56/001* (2013.01); *H04W 72/0493* (2013.01); *H04W 76/11* (2018.02)

(58) Field of Classification Search
CPC ... H04W 16/14; H04W 56/001; H04W 76/11; H04W 4/70; H04W 72/0406; H04B 1/7143; H04L 5/0012; H04L 5/001
See application file for complete search history.

(56) References Cited

U.S. PATENT DOCUMENTS

| | | | |
|---|---|---|---|
| 2016/0345118 A1* | 11/2016 | Oh | ........................ H04W 48/12 |
| 2018/0288747 A1 | 10/2018 | Sun et al. | |
| 2019/0007946 A1* | 1/2019 | Yerramalli | ............ H04W 76/27 |
| 2019/0313428 A1 | 10/2019 | Zhou et al. | |
| 2020/0084739 A1* | 3/2020 | Si | ........................ H04L 27/2666 |
| 2021/0168815 A1* | 6/2021 | Kim | ........................ H04L 5/001 |

OTHER PUBLICATIONS

Ericsson: "Summary of Email Discussion on NR-Light", 3GPP Draft, 3GPP TSG RAN Meeting #85, RP-192160, Summary of email Discussion on NR-Light, 3rd Generation Partnership Project (3GPP), Mobile Competence Centre, 650, Route Des Lucioles, F-06921 Sophia-Antipolis Cedex, France, vol. TSG RAN, No. Newport Beach, US, Sep. 16, 2019-Sep. 19, 2019, Sep. 9, 2019 (Sep. 9, 2019), XP051782678, pp. 1-56, Retrieved from the Internet: URL:http://www.3gpp.org/ftp/tsg_ran/TSG_RAN/TSGR_85/Docs/RP-192160.zip [retrieved on Sep. 9, 2019] p. 16 p. 41, p. 33, p. 42, p. 46.

International Search Report and Written Opinion—PCT/US2021/025772—ISA/EPO—dated Sep. 23, 2021.

* cited by examiner

*Primary Examiner* — Ricardo H Castaneyra
(74) *Attorney, Agent, or Firm* — Dalei Dong

(57) ABSTRACT

Various aspects of the present disclosure generally relate to wireless communication. In some aspects, a user equipment may determine that a first signal is associated with a New Radio Unlicensed (NR-U) Light configuration; determine a frequency hopping (FH) pattern and a set of FH channels for a second signal based at least in part on the determination that the first signal is associated with the NR-U Light configuration; and receive the second signal based at least in part on the FH pattern and the set of FH channels. Numerous other aspects are provided.

30 Claims, 15 Drawing Sheets

| Index | SS/PBCH block and control resource set multiplexing pattern | Number of RBs | Number of Symbols | Offset (RBs) | # FH channel, FH ch offset |
|---|---|---|---|---|---|
| 0 | 1 | 48 | 2 | 14 | 4, 0 |
| 1 | 1 | 48 | 2 | 14 | 4, 1 |
| 2 | 1 | 48 | 2 | 14 | 4, 2 |
| 3 | 1 | 48 | 2 | 14 | 4, 3 |
| 4 | 1 | 48 | 2 | 14 | 3, 0 |
| 5 | 1 | 48 | 2 | 14 | 3, 1 |
| 6 | 1 | 48 | 2 | 14 | 3, 2 |
| 7 | 1 | 48 | 2 | 14 | 2, 0 |
| 8 | 1 | 48 | 2 | 14 | 2, 1 |
| 9 | 1 | 48 | 2 | 14 | 5, 2 |
| 10 | 1 | 48 | 1 | 12 | 1, 0 |
| 11 | 1 | 48 | 1 | 16 | 1, 0 |
| 12 | 1 | 48 | 2 | 12 | 1, 0 |
| 13 | 1 | 48 | 2 | 14 | 1, 0 |
| 14 | 1 | 48 | 2 | 16 | 1, 0 |
| 15 | | | | | |

FIG. 7

| Index | SS/PBCH block and control resource set multiplexing pattern | Number of RBs | Number of Symbols | Offset (RBs) |
|---|---|---|---|---|
| 0 | 1 | 48x4 | 3 | 14 |
| 1 | 1 | 48x4 | 3 | 14+48 |
| 2 | 1 | 48x4 | 3 | 14+48x2 |
| 3 | 1 | 48x4 | 3 | 14+48x3 |
| 4 | 1 | 48x3 | 3 | 14+48 |
| 5 | 1 | 48x3 | 3 | 14+48x1 |
| 6 | 1 | 48x3 | 3 | 14+48x2 |
| 7 | 1 | 48x2 | 3 | 14+48 |
| 8 | 1 | 48x2 | 3 | 14+48x1 |
| 9 | 1 | 48x5 | 3 | 14+48x2 |
| 10 | 1 | 48 | 1 | 12 |
| 11 | 1 | 48 | 1 | 14 |
| 12 | 1 | 48 | 1 | 16 |
| 13 | 1 | 48 | 2 | 12 |
| 14 | 1 | 48 | 2 | 14 |
| 15 | 1 | 48 | 2 | 16 |

FIG. 10

TECHNIQUES FOR BANDWIDTH PART RESOURCE BLOCK OFFSET HOPPING

FIELD OF THE DISCLOSURE

Aspects of the present disclosure generally relate to wireless communication and to techniques and apparatuses for bandwidth part resource block offset hopping.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment, may include determining that a first signal is associated with a New Radio Unlicensed (NR-U) Light configuration; determining a frequency hopping (FH) pattern and a set of FH channels for a second signal based at least in part on the determination that the first signal is associated with the NR-U Light configuration; and receiving the second signal based at least in part on the FH pattern and the set of FH channels.

In some aspects, the first signal carries at least one of a master information block or a synchronization signal block and the second signal carries remaining minimum system information in a control resource set with index zero.

In some aspects, determining that the first signal is associated with the NR-U Light configuration is based at least in part on the first signal being on a synchronization raster associated with the NR-U Light configuration.

In some aspects, determining that the first signal is associated with the NR-U Light configuration is based at least in part on a value in the first signal indicating that the first signal is associated with the NR-U Light configuration.

In some aspects, the determination that the first signal is associated with the NR-U Light configuration is based at least in part on one or more codepoints of a table associated with a control resource set (CORESET) with index zero that is associated with the first signal.

In some aspects, the set of FH channels are included within a same frequency band.

In some aspects, the set of FH channels are included within a wideband channel of a base station from which the first signal or the second signal are received.

In some aspects, an initial FH channel location of the FH pattern is based at least in part on a frequency location and a bandwidth of a CORESET with a zero index.

In some aspects, the FH pattern indicates that a first hop is performed after the first signal is received and before the second signal is received.

In some aspects, a bandwidth of a CORESET with a zero index is fixed based at least in part on the first signal being associated with the NR-U Light configuration.

In some aspects, determining the FH pattern and the set of FH channels for the second signal further comprises dividing a bandwidth of a base station that transmits the first signal into a plurality of contiguous channels, wherein the set of FH channels correspond to the plurality of contiguous channels.

In some aspects, the first signal indicates a number of the plurality of contiguous channels.

In some aspects, a control resource set indication of the first signal indicates a number of the plurality of contiguous channels and an FH channel offset that indicates a channel, of the plurality of contiguous channels, in which a synchronization signal block associated with the initial signal is transmitted.

In some aspects, the set of FH channels are aligned with channel partitions of a band that includes the plurality of contiguous channels.

In some aspects, a bandwidth of a CORESET with index zero, corresponding to the first signal, includes a center of a channel of the set of FH channels, and a bandwidth of the channel of the set of FH channels is sufficiently wide to carry the CORESET with index zero.

In some aspects, the CORESET with index zero is a first CORESET with index zero corresponding to the first signal, and the CORESET with index zero indicates an FH channel index corresponding to the channel.

In some aspects, the FH pattern is determined based at least in part on at least one of timing information, a sub-band index associated with the first signal, or a cell identifier associated with the UE.

In some aspects, the FH pattern varies over time.

In some aspects, determining the FH pattern is based at least in part on receiving information, via the first signal, indicating one or more hops associated with the second signal.

In some aspects, determining the FH pattern is based at least in part on receiving information, via the first signal, indicating a pattern offset relative to a configured pattern.

In some aspects, a set of RB offsets for a set of CORESETs with index zero, corresponding to the set of FH channels, is defined relative to an initial synchronization signal block (SSB) location of the first signal.

In some aspects, a particular CORESET with index zero is in a same relative position, within an FH channel that includes the particular CORESET with index zero, as a relative position of the initial SSB location of the first signal within another FH channel.

In some aspects, the set of FH channels are included within a bandwidth of a wideband CORESET with index zero, and the set of FH channels correspond to respective groups of CCEs.

In some aspects, for a given hop identified by the FH pattern, a group of CCEs corresponding to an active FH channel are active, and downlink control channel candidates are populated in the active group of CCEs.

In some aspects, the FH pattern is based at least in part on at least one of a system frame number, a half frame index, or a sub-band index of the given hop.

In some aspects, for a common search space, the active group of CCEs for a given downlink control channel candidate are based at least in part on a number of CCEs associated with the wideband CORESET with index zero and an aggregation level of the given downlink control channel candidate.

In some aspects, the active group of CCEs is populated based at least in part on a number of CCEs, of the active group of CCEs, within the active FH channel.

In some aspects, the bandwidth of the wideband CORESET with index zero is included in an NR Unlicensed band, and a channel gap is provided between two or more FH channels of the set of FH channels, based at least in part on a number of symbols of the wideband CORESET with index zero.

In some aspects, the first signal indicates the bandwidth of the wideband CORESET with index zero, and the bandwidth of the wideband CORESET is equal to a number of the set of FH channels multiplied by a bandwidth of a single FH channel of the set of FH channels.

In some aspects, the first signal indicates a set of offsets corresponding to the set of FH channels.

In some aspects, the set of offsets are band-specific for an unlicensed band.

In some aspects, the first signal is transmitted at a center of an FH channel of the set of FH channels.

In some aspects, the FH pattern is a first FH pattern, wherein the second signal indicates a second FH pattern for a third signal, and the method further comprises transmitting or receiving the third signal in accordance with the second FH pattern.

In some aspects, the second signal indicates a plurality of resource block (RB) offsets for a plurality of FH channels associated with the second FH pattern, and the second FH pattern is based at least in part on a pseudo-random hoping pattern that uses the plurality of RB offsets.

In some aspects, a bitmap indicating frequency resources for a CORESET corresponding to a given hop is defined with regard to a starting position of a corresponding FH channel of the given hop.

In some aspects, a method of wireless communication, performed by a base station, may include transmitting a first signal that is associated with an NR-U Light configuration; and transmitting a second signal based at least in part on an FH pattern and a set of FH channels for the second signal based at least in part on the first signal being associated with the NR-U Light configuration.

In some aspects, the first signal carries at least one of a master information block or a synchronization signal block and the second signal carries remaining minimum system information in a control resource set with index zero. In some aspects, the first signal indicates that the first signal is associated with the NR-U Light configuration based at least in part on at least one of: the first signal being on a synchronization raster associated with the NR-U Light configuration, a value in the first signal indicating that the first signal is associated with the NR-U Light configuration, or one or more codepoints of a table associated with a CORESET with index zero that is associated with the first signal.

In some aspects, the set of FH channels is included within a wideband channel of the base station.

In some aspects, an initial FH channel location of the FH pattern is based at least in part on a frequency location and a bandwidth of a CORESET with a zero index.

In some aspects, the FH pattern indicates that a first hop is performed after the first signal is received and before the second signal is received.

In some aspects, a user equipment for wireless communication may include a memory and one or more processors operatively coupled to the memory. The memory and the one or more processors may be configured to determine that a first signal is associated with an NR-U Light configuration; determine an FH pattern and a set of FH channels for a second signal based at least in part on the determination that the first signal is associated with the NR-U Light configuration; and receive the second signal based at least in part on the FH pattern and the set of FH channels.

In some aspects, a base station for wireless communication may include a memory and one or more processors operatively coupled to the memory. The memory and the one or more processors may be configured to transmit a first signal that is associated with an NR-U Light configuration; and transmit a second signal based at least in part on an FH pattern and a set of FH channels for the second signal based at least in part on the first signal being associated with the NR-U Light configuration.

In some aspects, a non-transitory computer-readable medium may store one or more instructions for wireless communication. The one or more instructions, when executed by one or more processors of a UE, may cause the one or more processors to determine that a first signal is associated with an NR-U Light configuration; determine an FH pattern and a set of FH channels for a second signal based at least in part on the determination that the first signal is associated with the NR-U Light configuration; and receive the second signal based at least in part on the FH pattern and the set of FH channels.

In some aspects, a non-transitory computer-readable medium may store one or more instructions for wireless communication. The one or more instructions, when executed by one or more processors of a base station, may cause the one or more processors to transmit a first signal that is associated with an NR-U Light configuration; and transmit a second signal based at least in part on an FH pattern and a set of FH channels for the second signal based at least in part on the first signal being associated with the NR-U Light configuration.

In some aspects, an apparatus for wireless communication may include means for determining that a first signal is associated with an NR-U Light configuration; means for determining an FH pattern and a set of FH channels for a second signal based at least in part on the determination that the first signal is associated with the NR-U Light configuration; and means for receiving the second signal based at least in part on the FH pattern and the set of FH channels.

In some aspects, an apparatus for wireless communication may include means for transmitting a first signal that is associated with an NR-U Light configuration; and means for transmitting a second signal based at least in part on an FH pattern and a set of FH channels for the second signal based at least in part on the first signal being associated with the NR-U Light configuration.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 shows an example table associated with a controlResourceSetZero parameter for an NR-U Light configuration, in accordance with various aspects of the present disclosure.

FIG. 10 shows an example table associated with a controlResourceSetZero parameter for an NR-U Light configuration, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
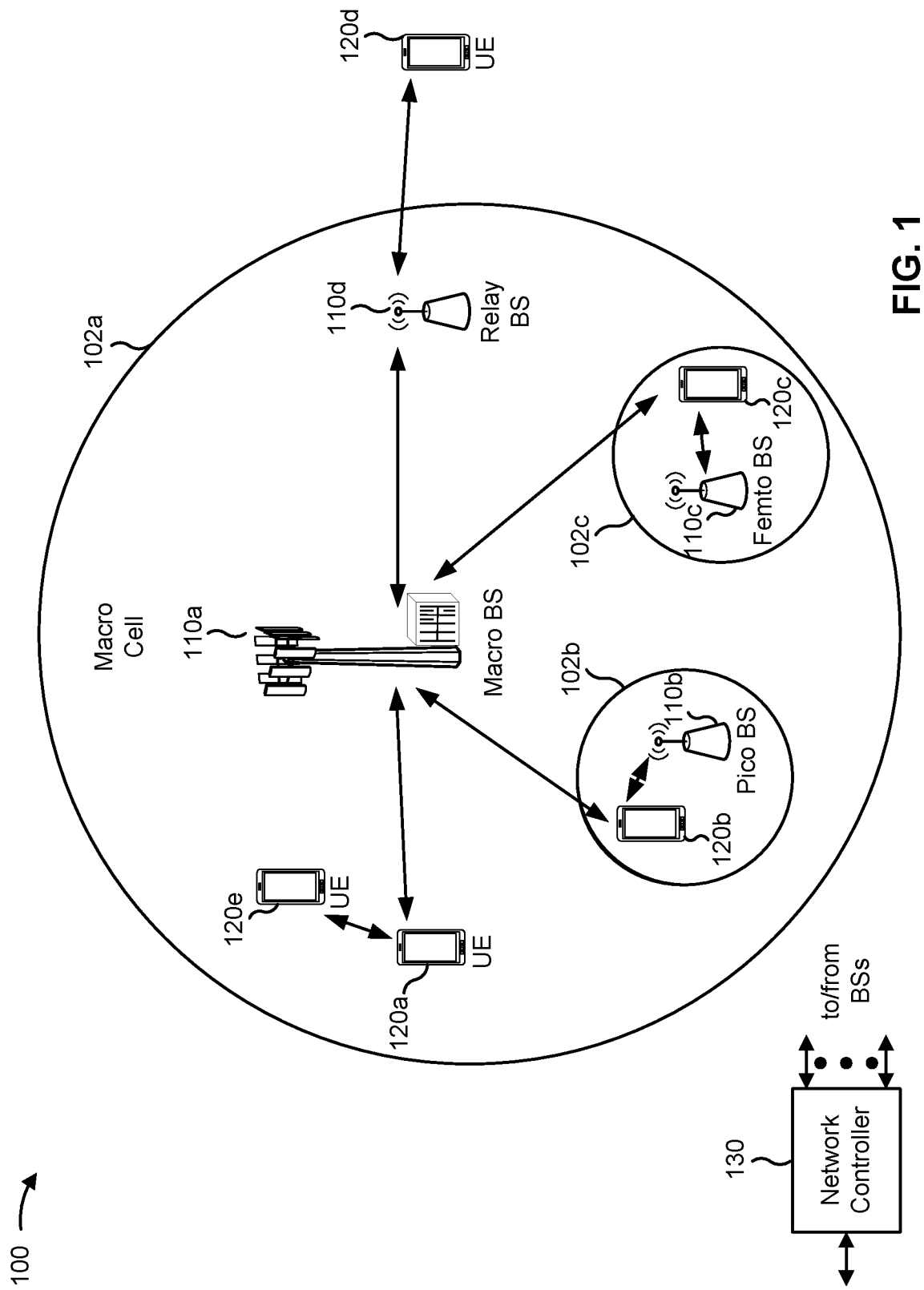
FIG. 1 is a diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
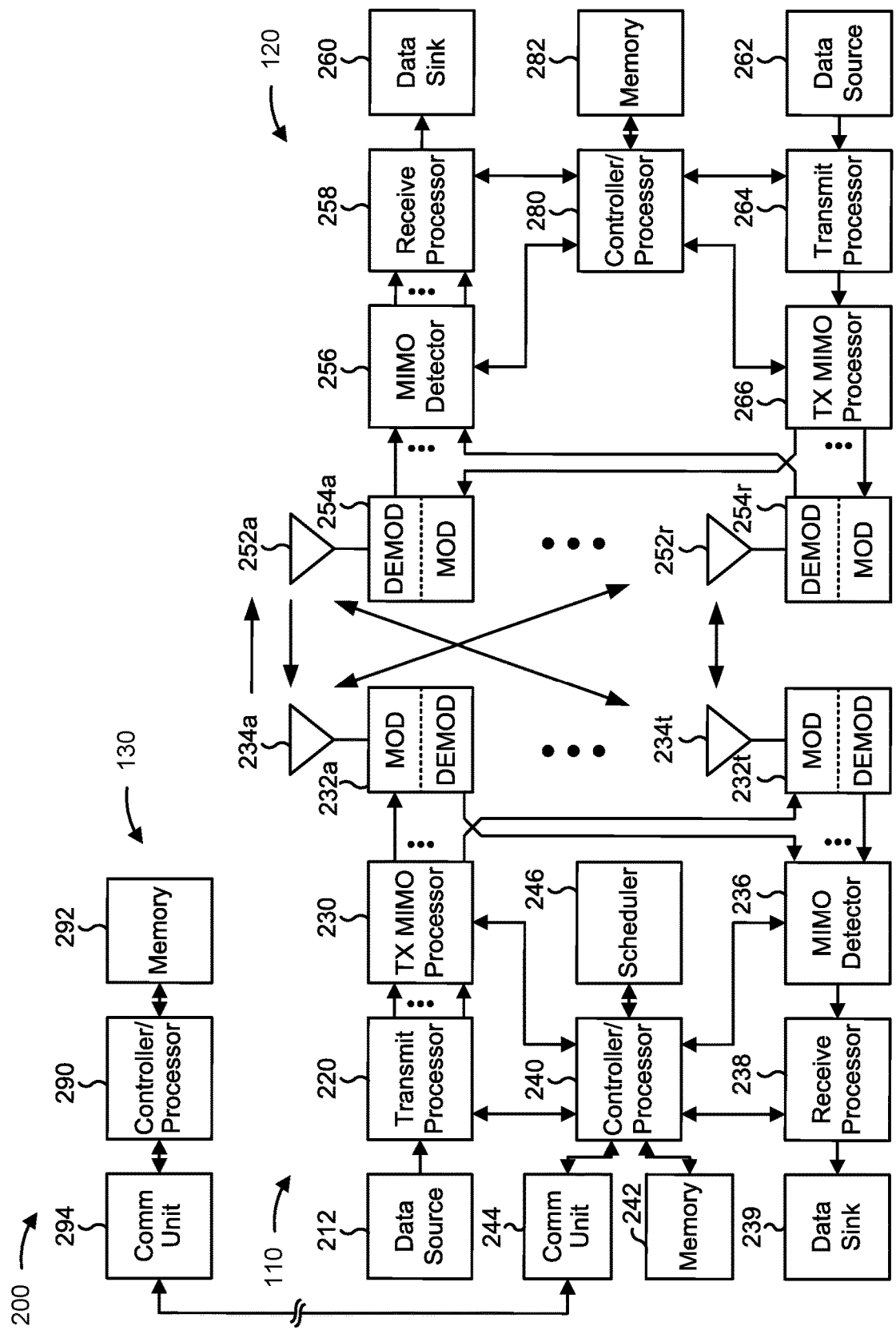
FIG. 2 is a diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with bandwidth part resource block offset hopping, as described in more detail elsewhere herein. For example, controller/processor 240 of base station 110, controller/processor 280 of UE 120, and/or any other component(s) of FIG. 2 may perform or direct operations of, for example, process 1200 of FIG. 12, process 1300 of FIG. 13, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 1200 of FIG. 12, process 1300 of FIG. 13, and/or other processes as described herein. A scheduler 246 may schedule UEs for data transmission on the downlink and/or uplink.

In some aspects, UE 120 may include means for determining that a first signal is associated with a New Radio Unlicensed (NR-U) Light configuration; means for determining a frequency hopping (FH) pattern and a set of FH channels for a second signal based at least in part on the determination that the first signal is associated with the NR-U Light configuration; means for receiving the second signal based at least in part on the FH pattern and the set of FH channels; means for dividing a bandwidth of a base station that transmits the first signal into a plurality of contiguous channels, wherein the set of FH channels corresponds to the plurality of contiguous channels, and wherein the first signal indicates a number of the plurality of contiguous channels; means for transmitting or receiving the third signal in accordance with the second FH pattern, wherein the second signal indicates a plurality of resource block (RB) offsets for a plurality of FH channels associated with the second FH pattern, and wherein the second FH pattern is based at least in part on a pseudo-random hopping pattern that uses the plurality of RB offsets; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for transmitting a first signal that is associated with an NR-U Light configuration, means for transmitting a second signal based at least in part on an FH pattern and a set of FH channels for the second signal based at least in part on the first signal being associated with the NR-U Light configuration; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

NR is designed to operate over a wide array of spectrum bands, for example, from low-frequency bands below approximately 1 gigahertz (GHz) and mid-frequency bands from approximately 1 GHz to approximately 6 GHz, to high-frequency bands such as millimeter wave (mmWave or mmW) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. The operations or deployments of NR in an unlicensed spectrum is referred to as NR-U. Wideband operations have been considered in NR-U where the system bandwidth may be partitioned into multiple subbands. For example, the system bandwidth may be approximately 80 megahertz (MHz) and may be partitioned into four 20 MHz subbands. A BS may perform LBT operations in one or more subbands within the system bandwidth. Depending on outcomes of the LBT operations, the BS may access one or more subbands for communications with UEs. In some aspects, the BS may configure a wideband UE (e.g., operating over a bandwidth greater than 20 MHz) to monitor multiple subbands at a time for communications with the BS.

NR can be extended to support communications with low-cost, narrowband wireless communication devices (e.g., Internet of thing (IoT) devices, machine-type communication (MTC) devices, and/or the like). The deployment of NR-U for low-cost wireless communication devices is referred to as NR-U Light, NR-U Light, or similar terms. These low-cost devices may be designed to operate over a narrower bandwidth (e.g., with transmissions and/or receptions limited to approximately 20 MHz or less), with a reduced transmission power (e.g., of approximately 14 decibel-milliwatts (dBm) to about 18 dBm), and/or with a reduced number of antennas compared to wideband UEs.

Unlicensed or shared spectrum may be associated with unpredictable interference conditions. Thus, a communication by a BS with a UE may be subject to interruption by interference in unlicensed or shared spectrum, which may be problematic for NR-U Light UEs that may be configured to operate on a narrower bandwidth (leading to a higher likelihood of interference across a substantial portion of an NR-U Light UE's operating bandwidth). In some cases, initial signaling from the BS to the UE, such as remaining minimum system information (RMSI) carried on a system information block 1 (SIB1), may be interrupted by such interference. For example, if RMSI transmission cannot share a Category 2 LBT opportunity with an SSB burst, then an RMSI transmission using a Category 4 LBT operation may be vulnerable to persistent interference. Even if the SSB and the RMSI are not blocked by failures of an LBT operation, reception interference at the UE may hinder reception of the RMSI, since the signal-to-noise ratio requirement for the RMSI is typically higher than for the SSB. If the RMSI is interrupted, then initial signaling between the UE and the BS is delayed, and network performance is degraded. In some cases, persistent interference may prevent the UE from receiving the RMSI for an extended period of time.

Techniques and apparatuses described herein provide frequency hopping patterns and configurations for initial signaling in an unlicensed or shared spectrum, such as for an NR-U Light UE. For example, techniques and apparatuses described herein provide frequency hopping between bandwidth parts for a synchronization signal block (SSB) burst and a corresponding SIB carrying an RMSI, so that interference on the SSB's initial channel is less likely to interfere with reception of the SIB. Furthermore, techniques and apparatuses described herein provide determination of the frequency hopping pattern, determination of frequency hopping channels for the frequency hopping pattern, determination of resource block offsets for the frequency hopping pattern, an indication that an initial signal is associated with an NR-U Light configuration, and signaling of a location of a control resource set (CORESET) with zero index (e.g., a CORESET that carries the RMSI). Some techniques and apparatuses described herein provide frequency hopping across multiple channels using corresponding BWPs. Some techniques and apparatuses described herein provide frequency hopping across multiple channels using a single wideband BWP. Also, signaling to support the above frequency hopping configuration and operations is provided. By configuring frequency hopping for initial signaling, resilience of the initial signaling between the BS and the UE is improved, thereby reducing interruption to NR-U Light communications and improving throughput.

Figure 3:
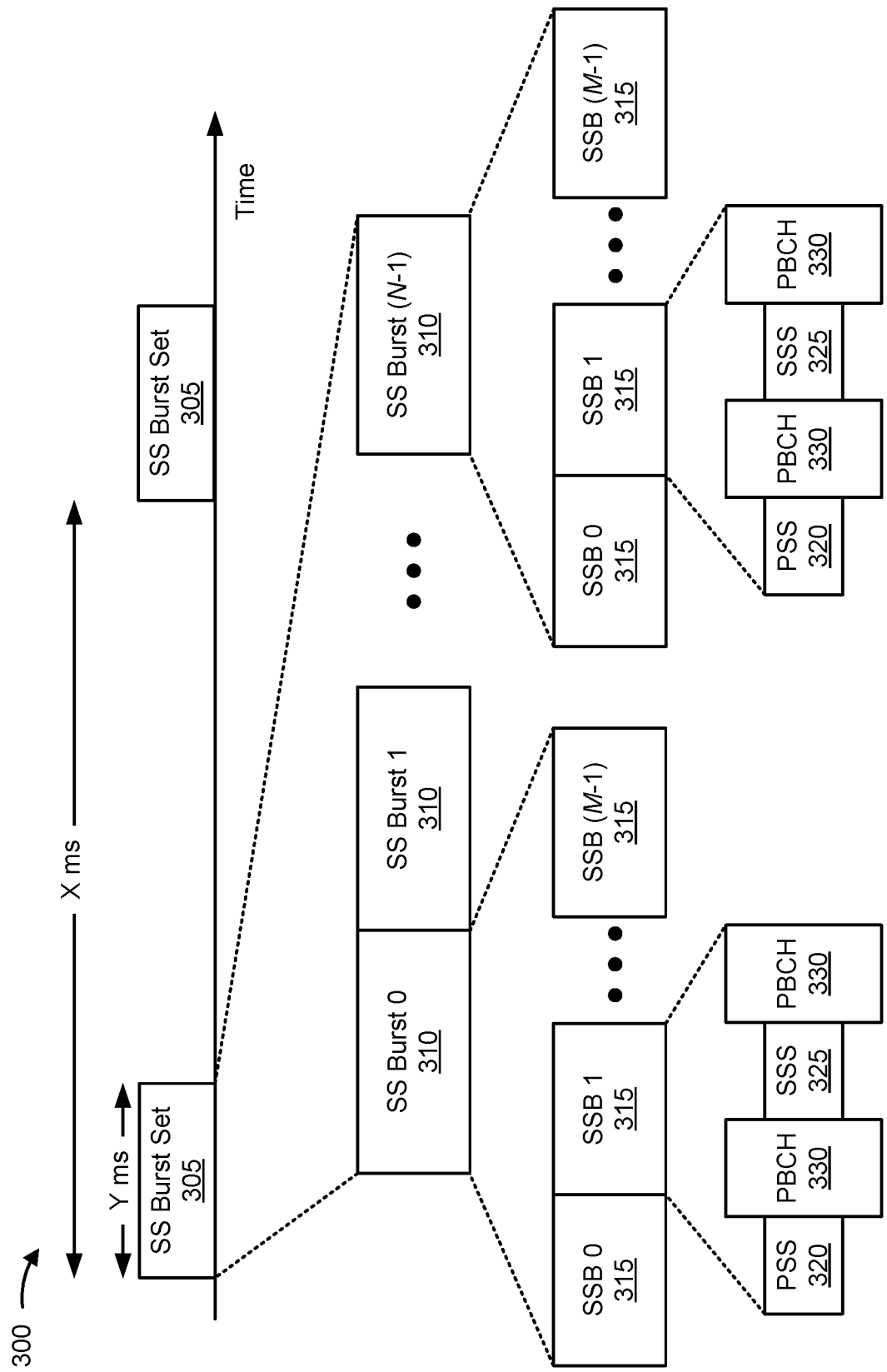
FIG. 3 is a diagram illustrating an example of a synchronization signal (SS) hierarchy, in accordance with various aspects of the present disclosure.

FIG. 3 is a diagram illustrating an example 300 of a synchronization signal (SS) hierarchy, in accordance with various aspects of the present disclosure. As shown in FIG. 3, the SS hierarchy may include an SS burst set 305, which may include multiple SS bursts 310, shown as SS burst 0 through SS burst N−1, where N is a maximum number of repetitions of the SS burst 310 that may be transmitted by the base station. As further shown, each SS burst 310 may include one or more SS blocks (SSBs) 315, shown as SSB 0 through SSB M−1, where M is a maximum number of SSBs 315 that can be carried by an SS burst 310. In some aspects, different SSBs 315 may be beam-formed differently (e.g., transmitted using different beams), and may be used for beam management, beam selection, and/or the like (e.g., as part of an initial network access procedure). An SS burst set 305 may be periodically transmitted by a wireless node (e.g., base station 110), such as every X milliseconds, as shown in FIG. 3. In some aspects, an SS burst set 305 may have a fixed or dynamic length, shown as Y milliseconds in FIG. 3. In some cases, an SS burst set 305 or an SS burst 310 may be referred to as a discovery reference signal (DRS) transmission window, an SSB measurement time configuration (SMTC) window, and/or the like.

In some aspects, an SSB 315 may include resources that carry a primary synchronization signal (PSS) 320, a secondary synchronization signal (SSS) 325, a physical broadcast channel (PBCH) 330, and/or the like. In some aspects, multiple SSBs 315 are included in an SS burst 310 (e.g., with transmission on different beams), and the PSS 320, the SSS 325, and/or the PBCH 330 may be the same across each SSB 315 of the SS burst 310. In some aspects, a single SSB 315 may be included in an SS burst 310. In some aspects, the SSB 315 may be at least four symbols (e.g., OFDM symbols) in length, where each symbol carries one or more of the PSS 320 (e.g., occupying one symbol), the SSS 325 (e.g., occupying one symbol), and/or the PBCH 330 (e.g., occupying two symbols). In some aspects, an SSB 315 may be referred to as an SS/PBCH block.

In some aspects, the symbols of an SSB 315 are consecutive, as shown in FIG. 3. In some aspects, the symbols of an SSB 315 are non-consecutive. Similarly, in some aspects, one or more SSBs 315 of the SS burst 310 may be transmitted in consecutive radio resources (e.g., consecutive symbols) during one or more slots. Additionally, or alternatively, one or more SSBs 315 of the SS burst 310 may be transmitted in non-consecutive radio resources.

In some aspects, the SS bursts 310 may have a burst period, and the SSBs 315 of the SS burst 310 may be transmitted by a wireless node (e.g., base station 110) according to the burst period. In such a case, the SSBs 315 may be repeated during each SS burst 310. In some aspects, the SS burst set 305 may have a burst set periodicity, whereby the SS bursts 310 of the SS burst set 305 are transmitted by the wireless node according to the fixed burst set periodicity. In other words, the SS bursts 310 may be repeated during each SS burst set 305.

In some aspects, an SSB 315 may include an SSB index, which may correspond to a beam used to carry the SSB 315. A UE 120 may monitor for and/or measure SSBs 315 using different receive (Rx) beams during an initial network access procedure. Based at least in part on the monitoring and/or measuring, the UE 120 may indicate one or more SSBs 315 with a best signal parameter (e.g., a reference signal received power (RSRP) parameter and/or the like) to a base station 110. The base station 110 and the UE 120 may use the one or more indicated SSBs 315 to select one or more beams to be used for communication between the base station 110 and the UE 120 (e.g., for a random access channel (RACH) procedure and/or the like). Additionally, or alternatively, the UE 120 may use the SSB 315 and/or the SSB index to determine a cell timing for a cell via which the SSB 315 is received (e.g., a serving cell).

In some aspects, an initial signal, such as an SS burst 310, an SSB 315, or an RMSI associated with the SS burst 310 and/or the SSB 315 (not shown), may be associated with an NR-U Light configuration. An NR-U Light configuration may mean that the SS burst 310, the SSB 315, or the RMSI may be associated with a frequency hopping configuration and/or may be transmitted for an NR-U Light UE. In some aspects, a UE 120 may determine that the SS burst 310, the SSB 315, or the RMSI is associated with an NR-U Light configuration. For example, the UE 120 may perform the determination based at least in part on a synchronization raster for NR-U Light (e.g., the UE 120 may search on the synchronization raster for NR-U Light, and may determine that an initial signal received on the synchronization raster is associated with the NR-U Light configuration). As another example, a reserved bit in a MIB carried by the PBCH may indicate that the initial signal is associated with the NR-U Light configuration. For example, a value of the reserved bit may indicate that the MIB is associated with a frequency hopping configuration, or may indicate that an interpretation of a parameter (e.g., a controlResourceSetZero parameter or a searchSpaceZeros parameter) of the MIB is to be performed in accordance with an NR Light configuration. As yet another example, a value of a parameter in the MIB (e.g., a controlResourceSetZero parameter or a searchSpaceZeros parameter) may indicate a table entry that identifies the initial signal as associated with NR Light. In such a case, the value may be associated with a codepoint of the parameter. If the UE 120 determines that the initial signal is associated with the NR Light configuration, the UE 120 may perform RMSI frequency hopping, may interpret a field of the MIB or the SIB1 in a fashion associated with the NR light configuration, or may use a table associated with the NR Light configuration to interpret the field of the MIB or the SIB 1.

As indicated above, FIG. 3 is provided as an example. Other examples may differ from what is described with regard to FIG. 3.

Figure 4:
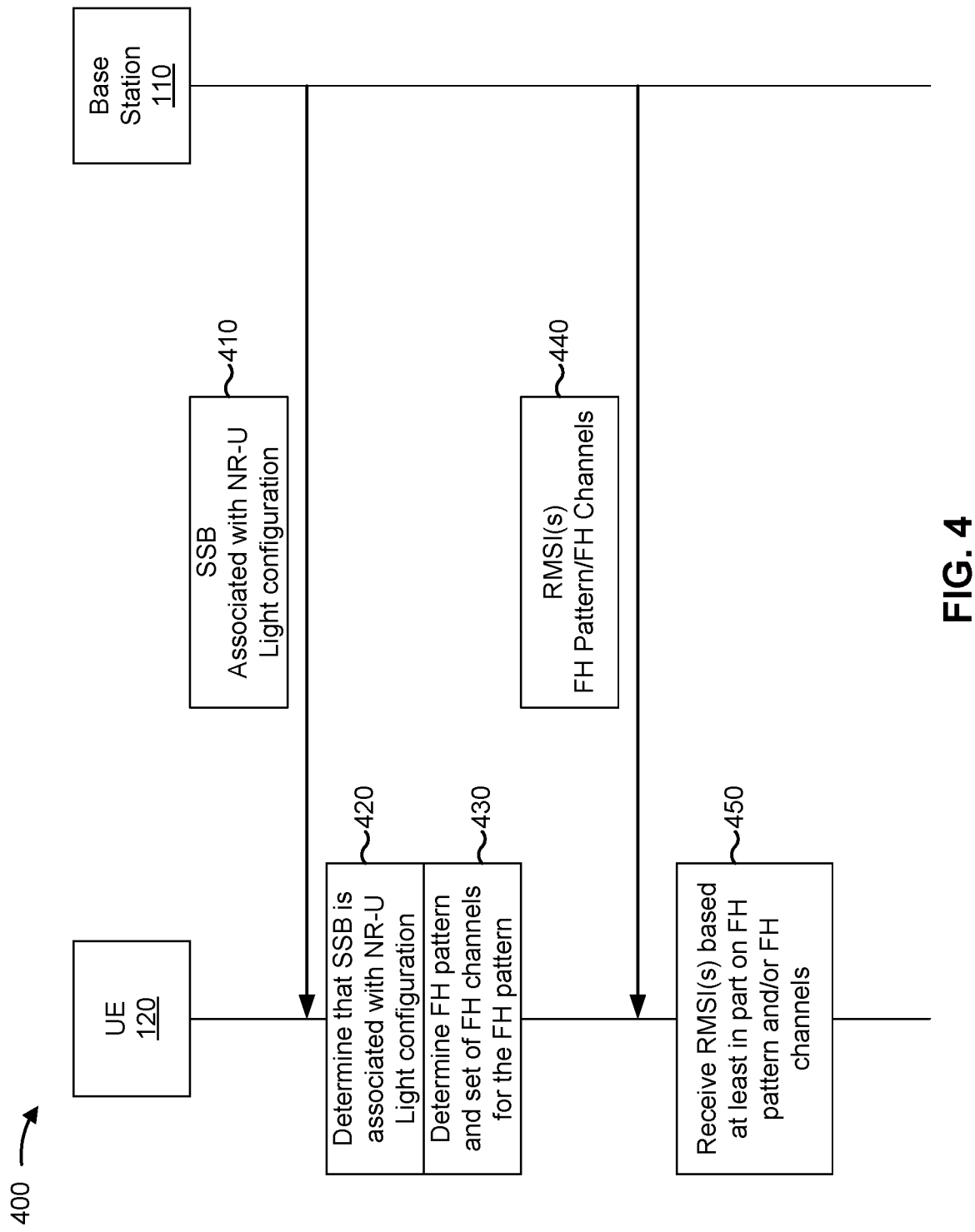
FIG. 4 is a diagram illustrating an example of signaling based at least in part on a frequency hopping pattern for initial signaling, in accordance with various aspects of the present disclosure.

FIG. 4 is a diagram illustrating an example 400 of signaling based at least in part on a frequency hopping pattern for initial signaling, in accordance with various aspects of the present disclosure. As shown, example 400 includes a UE 120 and a BS 110. In some aspects, the UE 120 may be an NR-U Light UE. Communications between the BS 110 and the UE 120 may occur on unlicensed or shared spectrum. In some aspects, the BS 110 may be associated with a wideband channel (e.g., a bandwidth of approximately 80 MHz, 100 MHz, and/or the like), and the UE 120 may use a single narrower channel of approximately 20 MHz within the BS 110's wideband channel.

As shown by reference number 410, the BS 110 may transmit an SSB to the UE 120. For example, the BS 110 may transmit an SS burst that includes the SSB. As further shown, the SSB may be associated with the NR-U Light configuration. The NR-U Light configuration may indicate that the UE 120 is to perform frequency hopping (FH) for communications associated with the SSB and/or the BS 110, or that the UE 120 is to interpret the SSB and/or an RMSI associated with the SSB based at least in part on the NR-U Light configuration. In some aspects, the BS 110 may transmit the SSB on an initial downlink BWP. For example, the initial BWP may have a bandwidth and frequency domain position of a CORESET with a zero index (e.g., CORESET #0). Generally, CORESET #0 refers to a CORESET in which a SIB carrying the RMSI is transmitted, so the techniques and apparatuses described herein are not limited to those in which the CORESET corresponding to the RMSI has a zero index.

As shown by reference number 420, the UE 120 may determine that the SSB is associated with the NR-U Light configuration. This is described in more detail in connection with FIG. 3, above. Accordingly, as shown by reference number 430, the UE 120 may determine an FH pattern and/or a set of FH channels for the FH pattern. The FH pattern may identify a series of hops for an RMSI (e.g., a SIB1 that carries the RMSI) across the set of FH channels.

The FH channels may correspond to bandwidth parts (BWPs) or to active sets of control channel elements (CCEs) of a wideband CORESET. In some aspects, the UE 120 may perform FH by hopping BWPs (e.g., before SIB1 and/or after SIB1), which is described in connection with FIGS. 5 and 6. In some aspects, the UE 120 may perform FH by hopping between groups of active CCEs of a wideband or virtual CORESET, which is described in connection with FIGS. 7 and 8.

As shown by reference number 440, the BS 110 may transmit one or more RMSIs (also referred to herein as one or more second signals) based at least in part on the FH pattern and/or the FH channels. For example, the BS 110 may transmit a second signal in accordance with the FH pattern on one or more of the FH channels. As shown by reference number 450, the UE 120 may receive the one or more RMSIs based at least in part on the FH pattern and/or the FH channels. For example, the UE 120 may monitor an FH channel at a time indicated by the FH pattern for a RMSI on the FH channel.

As indicated above, FIG. 4 is provided as an example. Other examples may differ from what is described with respect to FIG. 4.

Figure 5:
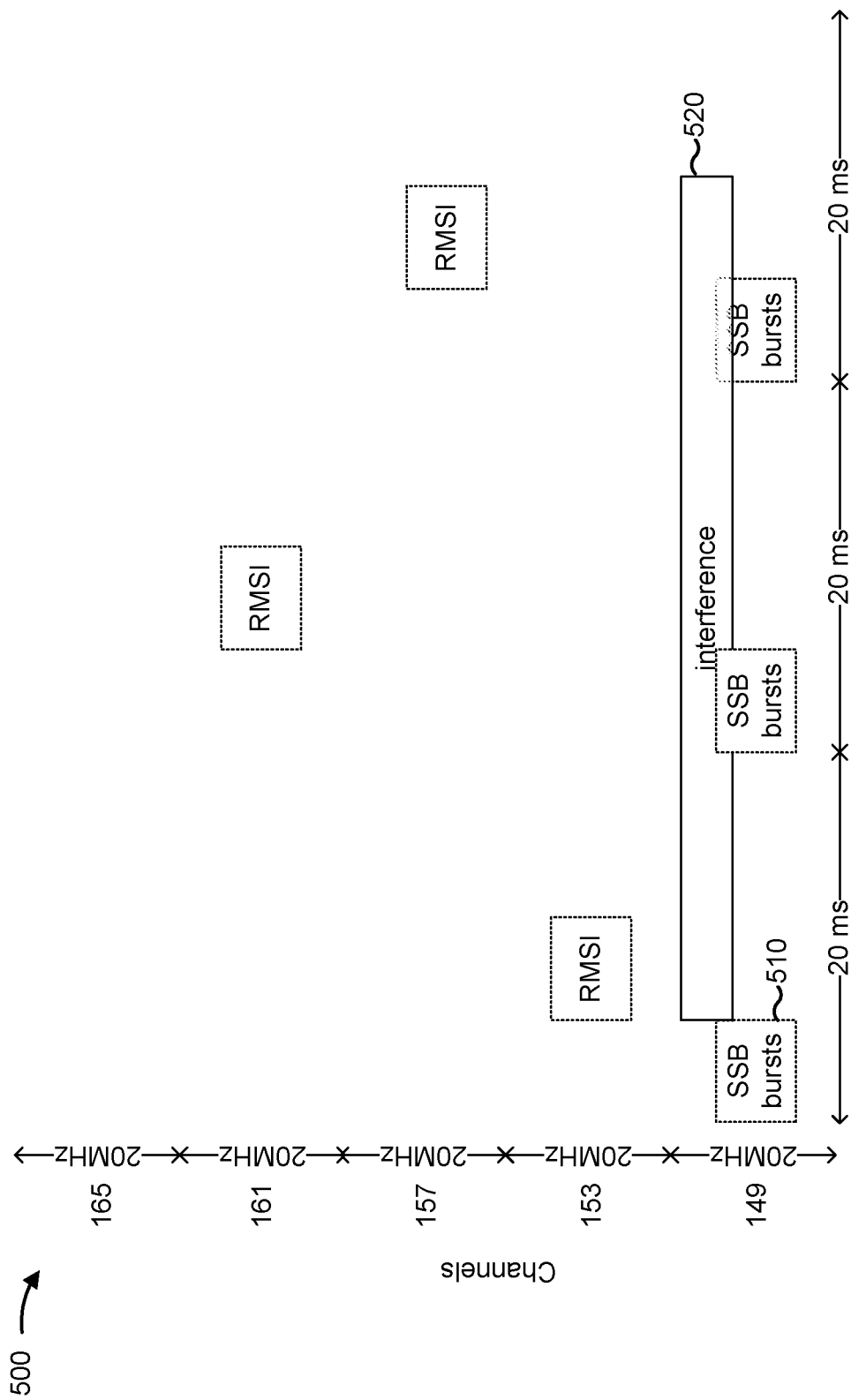
FIG. 5 is a diagram illustrating an example of a frequency hopping pattern for initial signaling, in accordance with various aspects of the present disclosure.

FIG. 5 is a diagram illustrating an example 500 of a frequency hopping pattern for initial signaling, in accordance with various aspects of the present disclosure. In example 500, a BS 110 (not shown) is associated with a wideband of 100 MHz that includes channels 149, 153, 157, 161, and 165. In some aspects, the BS 110 may be associated with a wideband of 80 MHz or a different bandwidth. A UE 120 (not shown) may be an NR-U Light UE, and may communicate on a single channel at a given time. As shown by reference number 510, the BS 110 may transmit SS bursts on channel 149, on which there is some amount of interference (shown by reference number 520). The BS 110 may then transmit second signals (e.g., RMSIs) on different channels in accordance with a 20 ms interval.

As indicated above, FIG. 5 is provided as an example. Other examples may differ from what is described with respect to FIG. 5.

Figure 6:
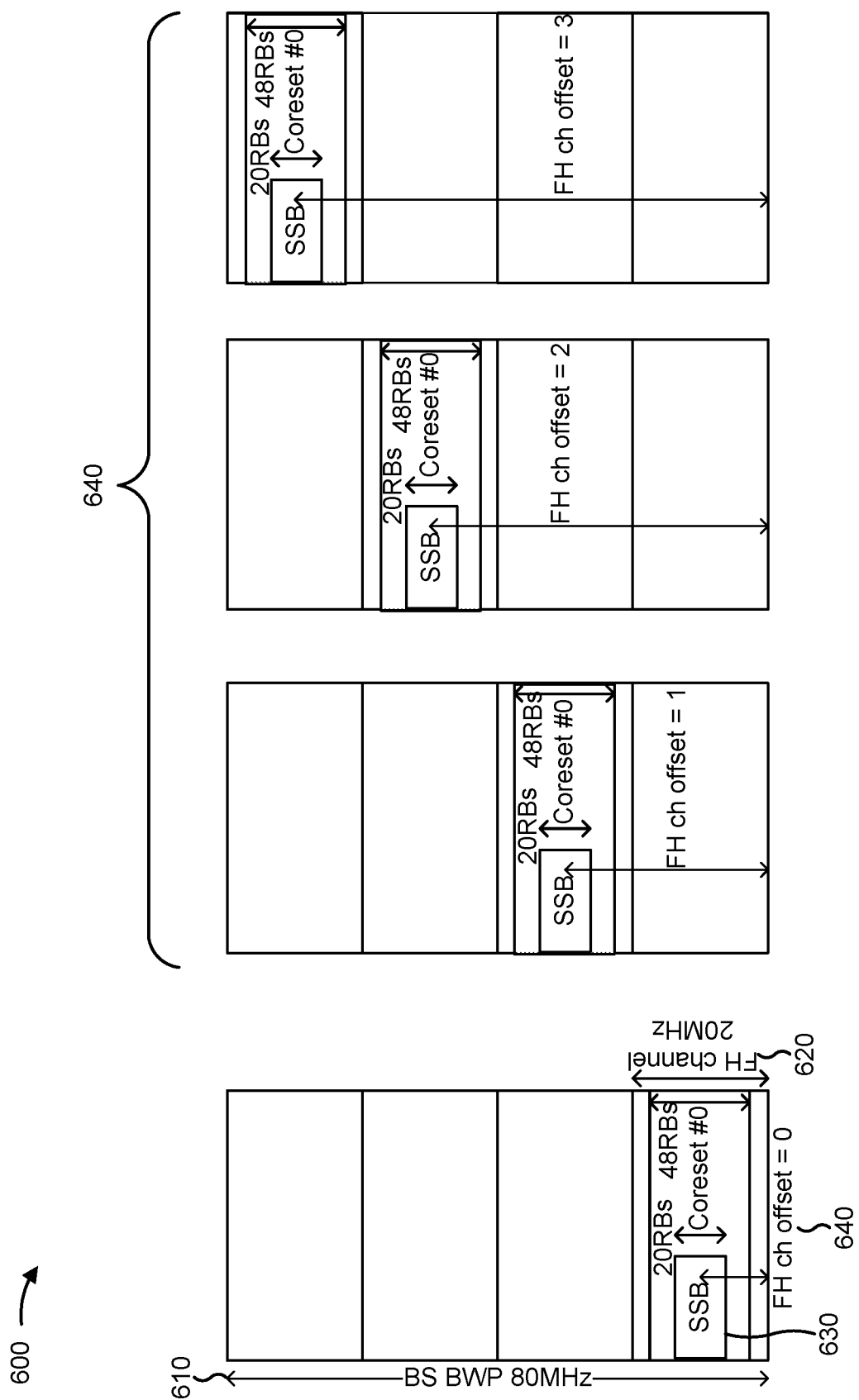
FIG. 6 is a diagram illustrating an example of synchronization signal block locations associated with respective FH channel offsets, in accordance with various aspects of the present disclosure.

FIG. 6 is a diagram illustrating an example 600 of synchronization signal block locations associated with respective FH channel offsets, in accordance with various aspects of the present disclosure. In example 600, a BS (e.g., BS 110) may have a bandwidth of 80 MHz, as shown by reference number 610. A UE (e.g., UE 120) may perform FH across FH channels of 20 MHz, as shown by reference number 620. In some aspects, such as in NR-U 5 GHz bands, the hopping channel bandwidth may be 20 MHz and FH may be performed over 80 or 100 MHz depending on the bandwidth of the band. In such a case, the hopping is limited to the bandwidth of a wideband BS. The SSB (e.g., SSB 630, in one example) may be transmitted in a given FH channel. In some aspects, the UE 120 and/or the BS 110 may determine locations of CORESET #0 in other FH channels, such as those shown by reference number 640, based at least in part on a potential location of an SSB in the other FH channels (referred to herein as an imaginary SSB). For example, the potential location of the SSB may be used to determine the FH channel offset of the corresponding FH channel. The FH channel offset may be an index and/or may define an offset between a reference point and a given FH channel. The reference point may be an initial downlink BWP, in some aspects.

In some aspects, the bandwidth of CORESET #0 may be limited to a single size, such as 48 RBs for a subcarrier spacing (SCS) of 30 kHz. In such a case, a plurality of codepoints may be available with regard to a parameter controlResourceSetZero. In some aspects, controlResourceSetZero may be referred to herein as a control resource set indication.

In some aspects, FH hops are within a signaled number of contiguous FH channels. The FH pattern may be based at least in part on a wideband BWP of the BS (e.g., the gNB), where the wideband BWP is less than or equal to the transmit/receive bandwidth on which the BS can operate. The BS's wideband BWP defines the frequency range in which hopping of the RMSI is allowed. The BS's wideband BWP may be divided into a number of contiguous FH channels, and RMSI may be allowed to hop only within these FH channels. For example, as shown, an 80 MHz wideband BWP can be evenly divided into four 20 MHz FH channels. In some aspects, the MIB may indicate the number of contiguous FH channels.

In some aspects, the BS may signal the locations and number of hopping channels in the MIB. For example, a controlResourceSetZero parameter may indicate a number of contiguous FH channels (4 in FIG. 6) and an FH channel offset that identifies an FH channel in which the SSB is transmitted. In this case, a column 710 in an example table 700 associated with a controlResourceSetZero parameter for an NR-U Light configuration (shown in FIG. 7) may identify a number of FH channels and an FH channel offset corresponding to an index of controlResourceSetZero. Furthermore, a column 720 of the table may identify a number of RBs for the CORESET #0, and/or a column 730 may identify a number of symbols for the CORESET #0.

In some aspects, an FH channel frequency location and an FH channel bandwidth may be chosen such that the FH channels are aligned with a channel partition in the band. For example, in an NR-U 5 GHz band, the FH channels may align with 20 MHz WiFi channels. In some aspects, an FH channel frequency location and an FH channel bandwidth may be chosen such that a CORESET #0/SSB is located at the center of the indicated FH channel and the BW is large enough to carry CORESET #0. For example, for a super-3 GHz band with a sync raster spacing of 1.44 MHz (4 RBs), the FH channel bandwidth may be set as 52 or 56 RBs. Thus, other SSBs/CORESET #0 could be transmitted at the center of the FH channel.

In some aspects, the FH may be performed based at least in part on a predefined FH pattern or an FH pattern indicated by the MIB associated with the SSB. In a first example, a predefined FH pattern may be generated based on timing information (e.g. a system frame number (SFN)), an SSB subband index (e.g., ssb_subband_idx), a cell identifier, and/or the like. For example, where $s_j$ is the jth channel in $N_{FH}$ FH channels, the FH subband of the initial BWP may be determined by $j=(g(2 \cdot SFN+half\_frame\_idx)+ssb\_subband\_idx) \bmod N_{FH}$. In a second example, the MIB may indicate (e.g., dynamically indicate) the FH channel index to which the initial BWP should hop.

In some aspects, the FH channel index to which the initial BWP should hop may be determined based at least in part on an FH pattern (e.g., a predefined pattern) and a pattern offset (e.g., indicated by the MIB). For example, the MIB may add a pattern offset to the predefined pattern based at least in part on a modulo operation. In this case, where $s_j$ is the jth FH subband in the signaled FH set, to determine which $s_j$ the CORESET #0 hops to, searchSpaceZeros in the MIB may indicate the FH subband offset $FH_{offset}$. For example, a codepoint of searchSpaceZeros may indicate the FH subband offset. The MIB may indicate where CORESET #0 is to hop. For example, j may be a function of cell identifier.

In this case, blind decoding hypotheses may be used for the CORESET #0, since the cell identifier may be unknown to the UE. In some aspects, a time-varying hopping pattern may be used, such as j=(g(2·SFN+half$_{frame_{idx}}$+FH$_{offset}$) ssb_subband_idx)mod N$_{FH}$.

In some aspects, the UE and/or the BS may determine a location of a CORESET #0 in an FH channel. For example, in an FH channel with an initial SSB (as shown, for example, by reference number 510 of FIG. 5), the location of the CORESET #0 may be signaled in the MIB based at least in part on an RB offset relative to a first RB of the SSB. In an FH channel that does not include an initial RB (as shown by the channels in which the RMSIs are transmitted in FIG. 5), a reference point for the RB offset may be determined based at least in part on a potential location of an SSB within the FH channel. For example, raster points in the FH channel may be selected so that the SSB would be located in a similar or same relative position, within the FH channel, as the initial SSB's location in the corresponding FH channel. In some aspects, NR-U may have a single raster point in each 20 MHz FH channel.

As indicated above, FIGS. 6 and 7 are provided as examples. Other examples may differ from what is described with respect to FIGS. 6 and 7.

Figure 8:
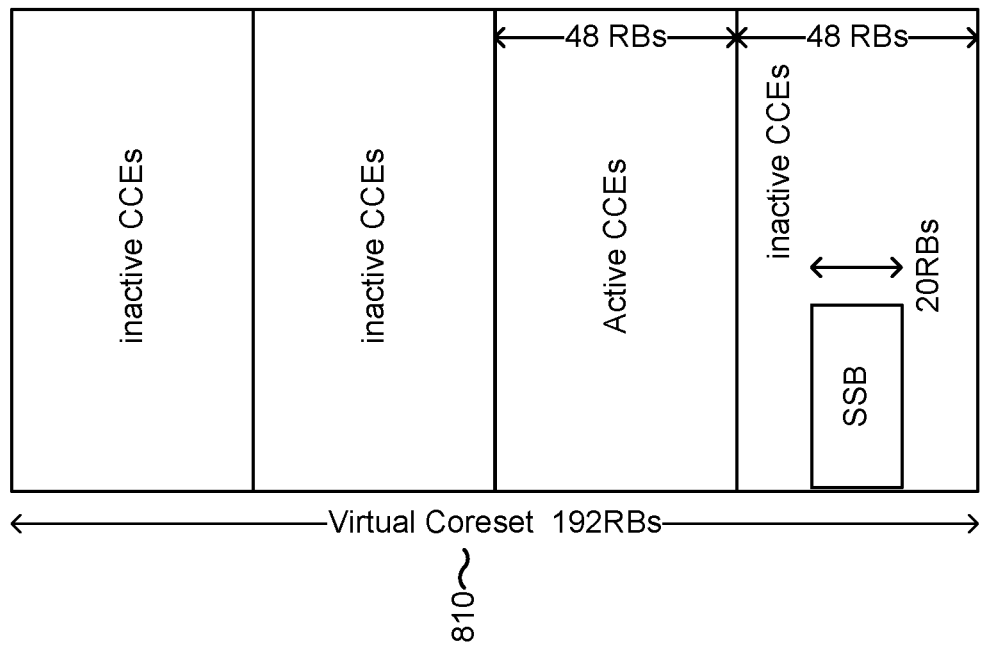
FIG. 8 is a diagram illustrating an example of a frequency hopping pattern that uses a wideband CORESET for FH, in accordance with various aspects of the present disclosure.

FIG. 8 is a diagram illustrating an example 800 of a frequency hopping pattern that uses a wideband CORESET for FH, in accordance with various aspects of the present disclosure. In some aspects, a BS (not shown) may define a virtual or wideband CORESET #0, as shown by reference number 810. The wideband CORESET #0 may span a plurality of FH channels, shown by reference number 820. The wideband CORESET #0 may be divided into groups of CCEs to form a plurality of FH channels (e.g., one group of CCEs per FH channel). An FH channel may be defined as a plurality of RBs (e.g., 48 RBs in example 800). At a given instance, one group of CCEs may be active, and physical downlink control channel (PDCCH) candidates may be populated in the active group of CCEs. In some aspects, the FH channel s$_j$ that PDCCH candidates occupied is determined by a predefined random pattern, such as j=(g(2·SFN+half_frame_idx)+ssb_subband_idx)mod N$_{FH}$, where ssb_subband_idx refers to an FH channel index where the SSB is transmitted.

In some aspects, for a common search space, the CCE indexes corresponding to PDCCH candidate m (at an aggregation level (AL) of L) are given by $$L \cdot \left\{ \left\lfloor \frac{m \cdot N_{CCE}}{L \cdot M_{max}^{(L)}} \right\rfloor \mod \left\lfloor \frac{N_{CCE}}{L} \right\rfloor \right\} + i,$$

where N$_{CCE}$ is the number of CCEs in CORESET #0, L is the aggregation level, i=0, 1, . . . L−1 and the smallest PDCCH candidate allocation unit is the CCE. When using an NR-U Light configuration associated with FH, CCE indexes for PDCCH candidate m may be determined according to $$L \cdot \left\{ \left\lfloor \frac{m \cdot N_{CCE\_FH\_CH}}{L \cdot M_{max}^{(L)}} \right\rfloor \mod \left\lfloor \frac{N_{CCE\_FH\_CH}}{L} \right\rfloor \right\} + i + j \cdot N_{CCE\_FH\_CH},$$

wherein PDCCH candidates only populate in the CCEs of the s$_j$'th FH channel, and wherein N$_{CCE\_FH\_CH}$ is a number of CCEs within each FH channel.

Figure 9:
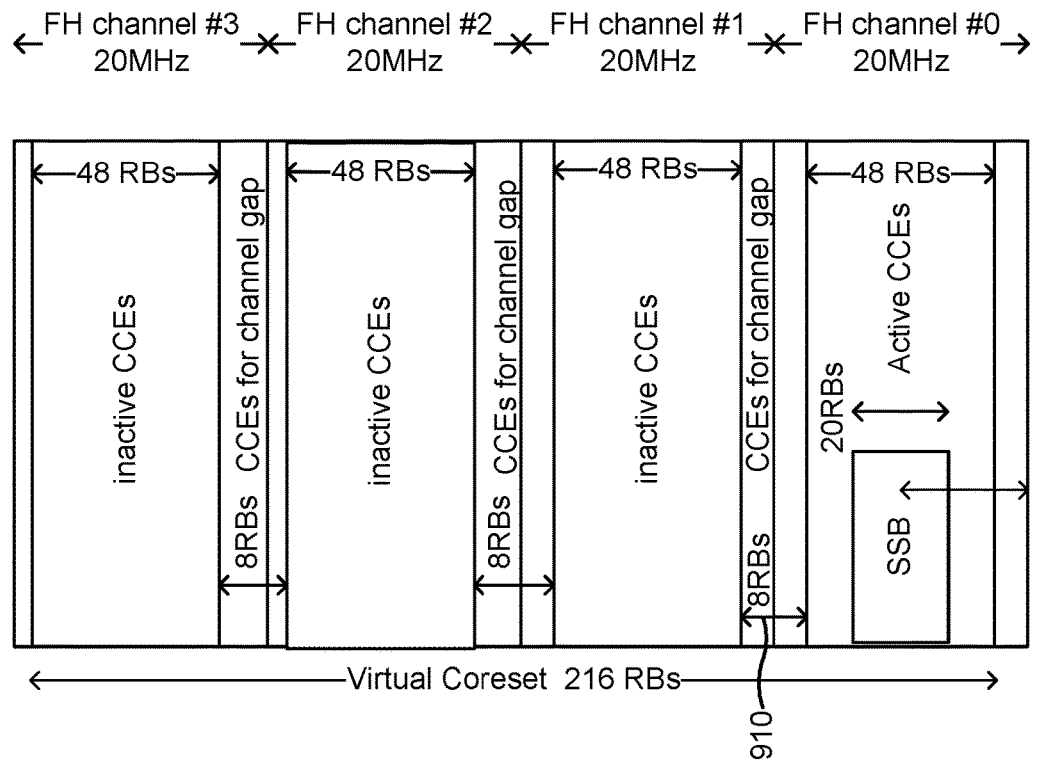
FIG. 9 is a diagram illustrating an example of a frequency hopping pattern with channel gaps in between FH channels, in accordance with various aspects of the present disclosure.

FIG. 9 is a diagram illustrating an example 900 of a frequency hopping pattern with channel gaps in between FH channels, in accordance with various aspects of the present disclosure. As shown in FIG. 9, a channel gap 910 may be provided in between two FH channels. In example 900, the channel gap 910 is 8 RBs in width. The channel gap 910 may be composed of a set of reserved CCEs. The reserved CCEs cannot be occupied by PDCCH candidates, and may serve as the channel gap. In some aspects, a size of the channel gap may be a multiple of 6 RBs, 3 RBs, and 2 RBs for 1-symbol, 2-symbol, and 3-symbol CORESETs, respectively. For example, for a 3-symbol CORESET #0, as shown in FIG. 9, there may be an 8 RB gap (e.g., 3 CCEs) between the FH channels. In some aspects, the CCE indexes for PDCCH candidate m, when using an NR-U Light configuration with FH, may be defined as $$L \cdot \left\{ \left\lfloor \frac{m \cdot N_{CCE\_FH\_CH}}{L \cdot M_{max}^{(L)}} \right\rfloor \mod \left\lfloor \frac{N_{CCE\_FH\_CH}}{L} \right\rfloor \right\} + i + j \cdot (N_{CCE\_FH\_CH} + N_{CCE_{gap}}).$$

In some aspects, the BS may signal, to the UE, a bandwidth of the wideband CORESET #0 and an offset relative to an SSB (or another initial signal). For example, the BS may signal the bandwidth and the offset via controlResourceSetZero in the MIB. In some aspects, the BS may use a fixed FH channel bandwidth (e.g., 48 RBs for a licensed band and 56 RBs for an NR-U band). The number of RBs to be included in the wideband CORESET #0 may be (# of FH channels) x (FH channel bandwidth). For a licensed band, SSBs may be transmitted at the center of one of the FH channel. An offset value (e.g., column 1010 in FIG. 10, which shows an example table 1000 associated with a controlResourceSetZero parameter for an NR-U Light configuration, in accordance with various aspects of the present disclosure) may indicate an offset of physical resource block (PRB) #0 of CORESET #0 relative to the first RB of an SSB. Thus, for N FH channels, only N offset values may be used. In some aspects, for NR-U, the N offsets may not be uniform. For example, the SSB raster points may not be located in the center of the FH channel, so another column of the controlResourceSetZero table (not shown) may indicate a band-specific offset for NR-U.

In some aspects, a BS and a UE may perform FH after the RMSI (e.g., SIB1) with regard to a subsequent SIB (e.g., SIB-X, where X is greater than 1), a random access response (RAR), a paging message, and/or the like. In this case, the FH pattern may be cell-specific, since the UE has received the cell identifier in the RMSI. In some aspects, the RMSI (e.g., SIB1) may signal MRB offsets in a parameter (e.g., bwp-common and/or the like), which correspond to MBWP starting positions and MLBT subbands (e.g. $N_{BWP,0}^{start}$, $N_{BWP,1}^{start}$, . . . , $N_{BWP,i,M-1}^{start}$). The UE may be associated with a pseudo-random hopping pattern c(k) based at least in part on M RB offsets where 0≤c(k)≤M−1. c(k) may determine the BWP starting position at time k, and c(k) may be based at least in part on the slot index, the SFN, and the cell identifier. In some aspects, c(k) may be preconfigured for the UE. For a time instance k, BWP i may have a starting position at frequency (CRB) $NN_{BWP,P,c(k)}^{start}$;

As indicated above, FIGS. 8-10 are provided as one or more examples. Other examples may differ from what is described with respect to FIGS. 8-10.

Figure 11:
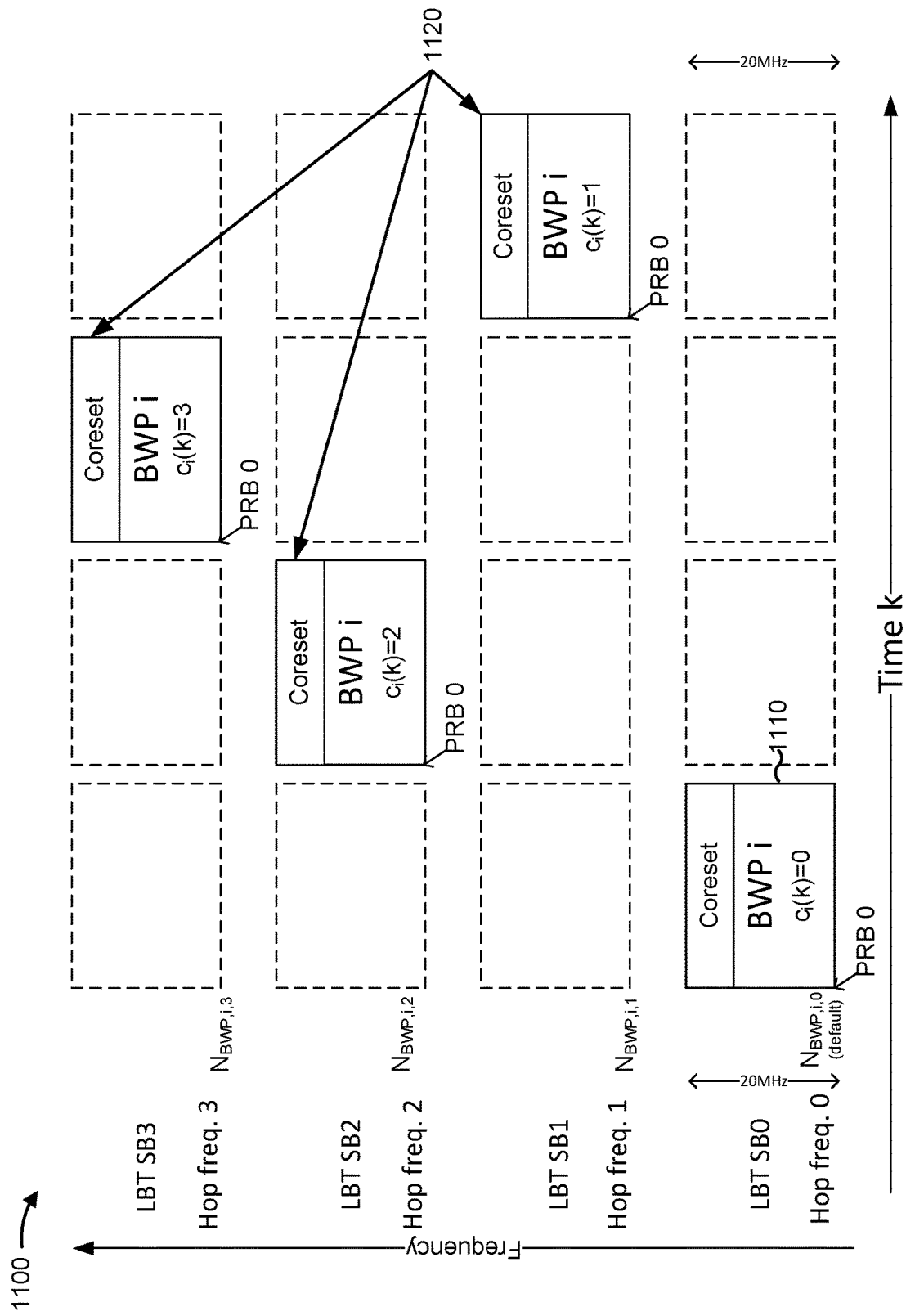
FIG. 11 is a diagram illustrating an example 1100 of a technique for CORESET hopping in connection with UE-specific BWP hopping, in accordance with various aspects of the present disclosure.

FIG. 11 is a diagram illustrating an example 1100 of a technique for CORESET hopping in connection with UE-specific BWP hopping, in accordance with various aspects of the present disclosure. Example 1100 shows various hopping frequencies (e.g., FH channels) corresponding to LBT subbands (SBs) and BWPs corresponding to the hopping frequencies. As shown, an initial BWP 1110 may hop across different FH channels over time. The hopping may be UE-specific, meaning that a given UE is configured to perform the hopping based at least in part on a UE-specific FH pattern. As shown by reference number 1120, a CORESET may hop with the BWP.

For example, the CORESET may be associated with a bitmap of frequency-domain resources (e.g., a frequencyDomainResources bitmap). The bitmap may be defined with regard to a BWP starting position $N_{BWP}^{start}$ after a hop. Thus, if the BWP hops to a different RB offset relative to an initial BWP, the CORESET hops with the BWP.

As indicated above, FIG. 11 is provided as an example. Other examples may differ from what is provided with regard to FIG. 11.

Figure 12:
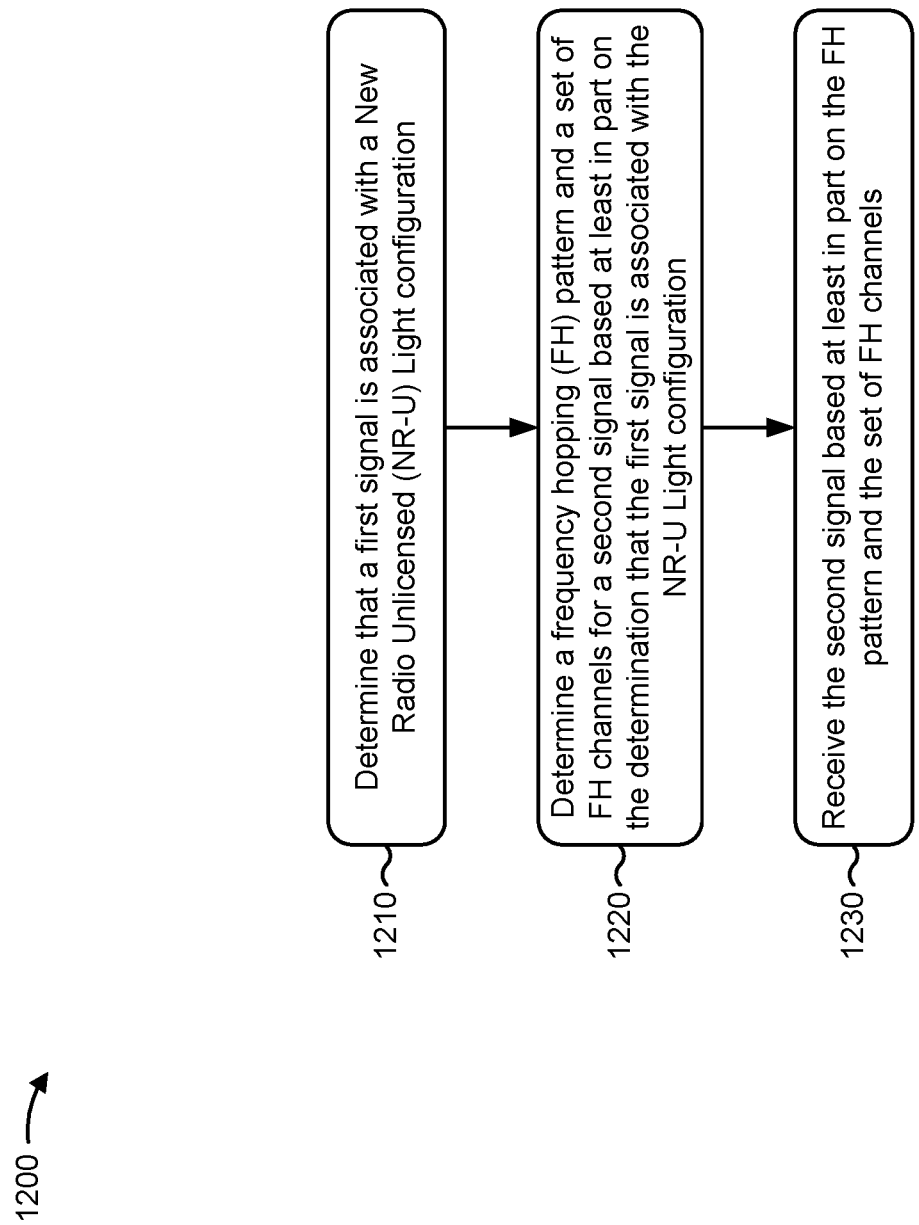
FIG. 12 is a diagram illustrating an example process performed, for example, by a user equipment, in accordance with various aspects of the present disclosure.

FIG. 12 is a diagram illustrating an example process 1200 performed, for example, by a UE, in accordance with various aspects of the present disclosure. Example process 1200 is an example where the UE (e.g., UE 120 and/or the like) performs operations associated with techniques for bandwidth part resource block offset hopping.

As shown in FIG. 12, in some aspects, process 1200 may include determining that a first signal is associated with a New Radio Unlicensed (NR-U) Light configuration (block 1210). For example, the UE (e.g., using antenna 252, DEMOD 254, MIMO detector 256, receive processor 258, controller/processor 280, and/or the like) may determine that a first signal is associated with an NR-U Light configuration, as described above.

As further shown in FIG. 12, in some aspects, process 1200 may include determining an FH pattern and a set of FH channels for a second signal based at least in part on the determination that the first signal is associated with the NR-U Light configuration (block 1220). For example, the UE (e.g., using antenna 252, DEMOD 254, MIMO detector 256, receive processor 258, controller/processor 280, and/or the like) may determine an FH pattern and a set of FH channels for a second signal based at least in part on the determination that the first signal is associated with the NR-U Light configuration, as described above.

As further shown in FIG. 12, in some aspects, process 1200 may include receiving the second signal based at least in part on the FH pattern and the set of FH channels (block 1230). For example, the UE (e.g., using antenna 252, DEMOD 254, MIMO detector 256, receive processor 258, controller/processor 280, and/or the like) may receive the second signal based at least in part on the FH pattern and the set of FH channels, as described above.

Process 1200 may include additional aspects, such as any single aspect or any combination of aspects described below and/or in connection with one or more other processes described elsewhere herein.

In a first aspect, the first signal carries at least one of a master information block or a synchronization signal block and the second signal carries remaining minimum system information in a control resource set with index zero.

In a second aspect, alone or in combination with the first aspect, the determination that the first signal is associated with the NR-U Light configuration is based at least in part on at least one of: the first signal being on a synchronization raster associated with the NR-U Light configuration, a value in the first signal indicating that the first signal is associated with the NR-U Light configuration, or one or more codepoints of a table associated with a CORESET with index zero that is associated with the first signal.

In a third aspect, alone or in combination with one or more of the first and second aspects, the set of FH channels is included within a wideband channel of a base station from which the first signal or the second signal is received.

In a fourth aspect, alone or in combination with one or more of the first through third aspects, an initial FH channel location of the FH pattern is based at least in part on a frequency location and a bandwidth of a CORESET with a zero index.

In a fifth aspect, alone or in combination with one or more of the first through fourth aspects, the FH pattern indicates that a first hop is performed after the first signal is received and before the second signal is received.

In a sixth aspect, alone or in combination with one or more of the first through fifth aspects, determining the FH pattern and the set of FH channels for the second signal comprises: dividing a bandwidth of a base station that transmits the first signal into a plurality of contiguous channels, the set of FH channels corresponds to the plurality of contiguous channels, and the first signal indicates a number of the plurality of contiguous channels.

In a seventh aspect, alone or in combination with one or more of the first through sixth aspects, a control resource set indication of the first signal indicates a number of the plurality of contiguous channels and an FH channel offset that indicates a channel, of the plurality of contiguous channels, in which a synchronization signal block associated with the first signal is transmitted.

In an eighth aspect, alone or in combination with one or more of the first through seventh aspects, a bandwidth of a CORESET with index zero, corresponding to the first signal, includes a center of a channel of the set of FH channels, a bandwidth of the channel of the set of FH channels is sufficiently wide to carry the CORESET with index zero, and the CORESET with index zero is a first CORESET with index zero corresponding to the first signal, and the CORESET with index zero indicates an FH channel index corresponding to the channel.

In a ninth aspect, alone or in combination with one or more of the first through eighth aspects, the FH pattern is determined based at least in part on at least one of timing information, a sub-band index associated with the first signal, or a cell identifier associated with the UE.

In a tenth aspect, alone or in combination with one or more of the first through ninth aspects, determining the FH pattern is based at least in part on receiving information, via the first signal, indicating at least one of one or more hops associated with the second signal or a pattern offset relative to a configured pattern.

In an eleventh aspect, alone or in combination with one or more of the first through tenth aspects, a set of RB offsets for a set of CORESETs with index zero, corresponding to the set of FH channels, is defined relative to an initial synchronization signal block (SSB) location of the first signal, wherein a particular CORESET with index zero is associated with a relative position, within an FH channel that includes the particular CORESET with index zero, that corresponds to a relative position of the initial SSB location of the first signal within another FH channel.

In a twelfth aspect, alone or in combination with one or more of the first through eleventh aspects, the set of FH channels are included within a bandwidth of a wideband CORESET with index zero, and the set of FH channels correspond to respective groups of control channel elements (CCEs).

In a thirteenth aspect, alone or in combination with one or more of the first through twelfth aspects, for a given hop identified by the FH pattern, a group of CCEs corresponding to an active FH channel are active, and downlink control channel candidates are populated in the active group of CCEs.

In a fourteenth aspect, alone or in combination with one or more of the first through thirteenth aspects, the FH pattern is based at least in part on at least one of a system frame number, a half frame index, or a sub-band index of the given hop.

In a fifteenth aspect, alone or in combination with one or more of the first through fourteenth aspects, for a common search space, the active group of CCEs for a given downlink control channel candidate is based at least in part on a number of CCEs associated with the wideband CORESET with index zero and an aggregation level of the given downlink control channel candidate.

In a sixteenth aspect, alone or in combination with one or more of the first through fifteenth aspects, the bandwidth of the wideband CORESET with index zero is included in an NR Unlicensed band, and a channel gap is provided between two or more FH channels of the set of FH channels, based at least in part on a number of symbols of the wideband CORESET with index zero.

In a seventeenth aspect, alone or in combination with one or more of the first through sixteenth aspects, the first signal indicates the bandwidth of the wideband CORESET with index zero, and the bandwidth of the wideband CORESET is equal to a number of the set of FH channels multiplied by a bandwidth of a single FH channel of the set of FH channels.

In an eighteenth aspect, alone or in combination with one or more of the first through seventeenth aspects, the FH pattern is a first FH pattern, the second signal indicates a second FH pattern for a third signal, and the method further comprises: transmitting or receiving the third signal in accordance with the second FH pattern, where the second signal indicates a plurality of resource block (RB) offsets for a plurality of FH channels associated with the second FH pattern, and the second FH pattern is based at least in part on a pseudo-random hopping pattern that uses the plurality of RB offsets.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
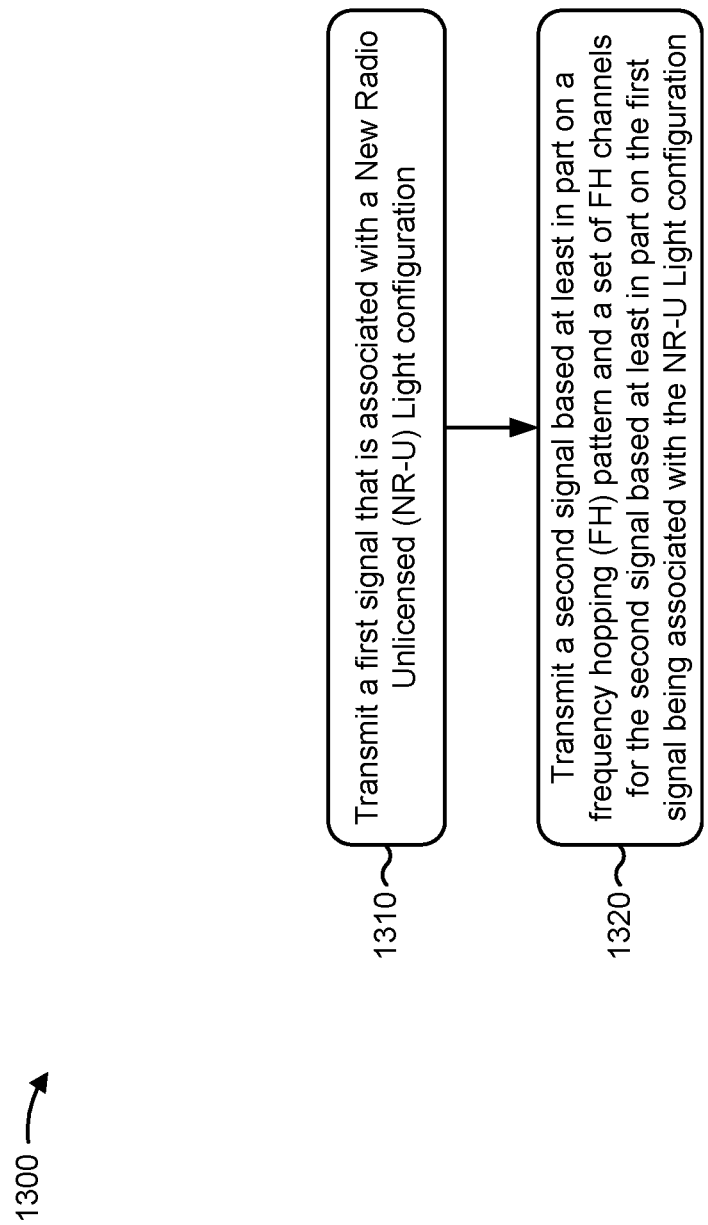
FIG. 13 is a diagram illustrating an example process performed, for example, by a base station, in accordance with various aspects of the present disclosure.

FIG. 13 is a diagram illustrating an example process 1300 performed, for example, by a base station, in accordance with various aspects of the present disclosure. Example process 1300 is an example where the base station (e.g., base station 110 and/or the like) performs operations associated with techniques for BWP RB offset hopping.

As shown in FIG. 13, in some aspects, process 1300 may include transmitting a first signal that is associated with an NR-U Light configuration (block 1310). For example, the base station (e.g., using controller/processor 240, transmit processor 220, TX MIMO processor 230, MOD 232, antenna 234, and/or the like) may transmit a first signal that is associated with an NR-U Light configuration, as described above.

As further shown in FIG. 13, in some aspects, process 1300 may include transmitting a second signal based at least in part on an FH pattern and a set of FH channels for the second signal based at least in part on the first signal being associated with the NR-U Light configuration (block 1320). For example, the base station (e.g., using controller/processor 240, transmit processor 220, TX MIMO processor 230, MOD 232, antenna 234, and/or the like) may transmit a second signal based at least in part on an FH pattern and a set of FH channels for the second signal based at least in part on the first signal being associated with the NR-U Light configuration, as described above.

Process 1300 may include additional aspects, such as any single aspect or any combination of aspects described below and/or in connection with one or more other processes described elsewhere herein.

In a first aspect, the first signal carries at least one of a master information block or a synchronization signal block and the second signal carries remaining minimum system information in a control resource set with index zero.

In a second aspect, alone or in combination with the first aspect, the first signal indicates that the first signal is associated with the NR-U Light configuration based at least in part on at least one of: the first signal being on a synchronization raster associated with the NR-U Light configuration, a value in the first signal indicating that the first signal is associated with the NR-U Light configuration, or one or more codepoints of a table associated with a CORESET with index zero that is associated with the first signal.

In a third aspect, alone or in combination with one or more of the first and second aspects, the set of FH channels is included within a wideband channel of the base station.

In a fourth aspect, alone or in combination with one or more of the first through third aspects, an initial FH channel location of the FH pattern is based at least in part on a frequency location and a bandwidth of a CORESET with a zero index.

In a fifth aspect, alone or in combination with one or more of the first through fourth aspects, the FH pattern indicates that a first hop is performed after the first signal is received and before the second signal is received.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
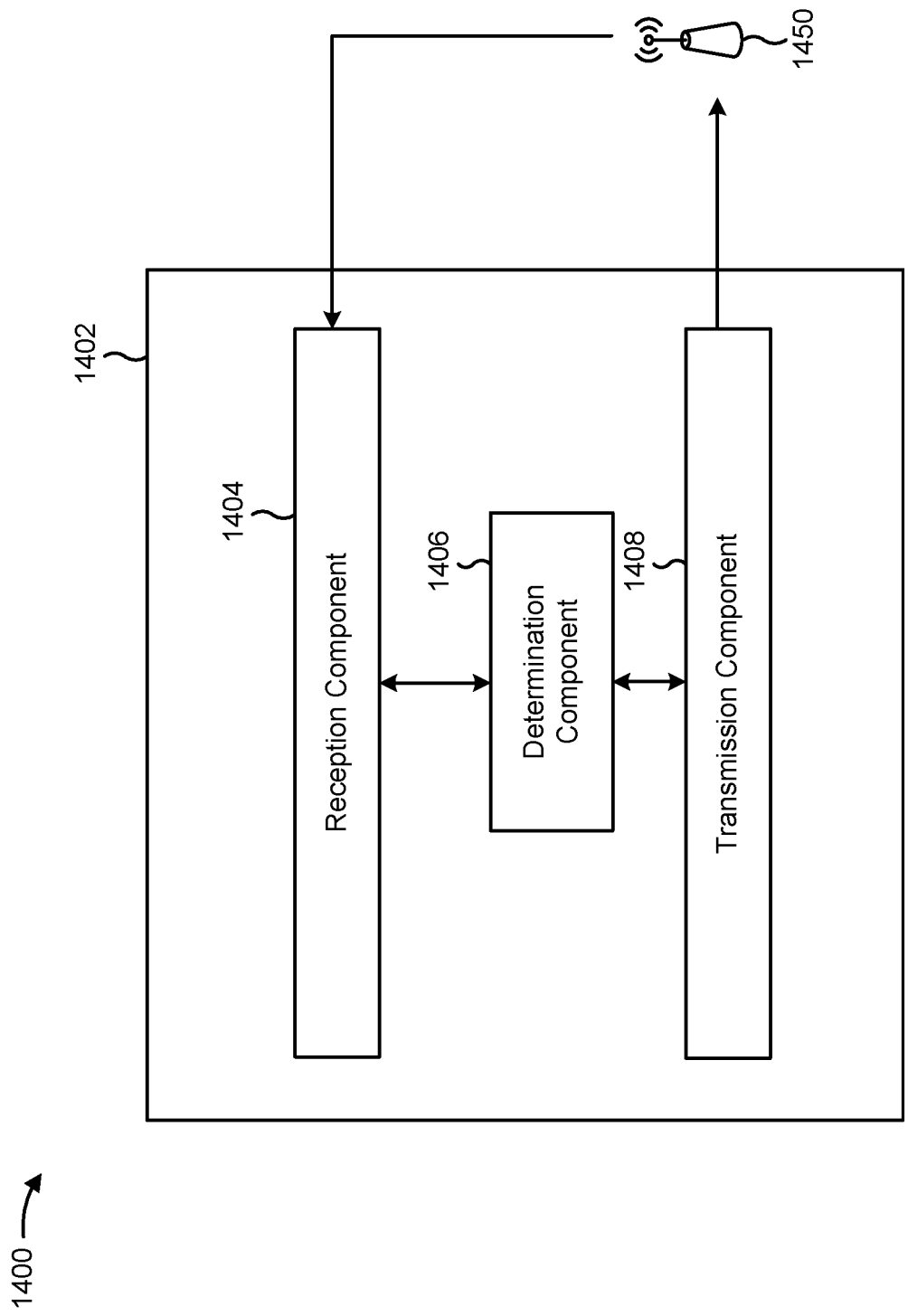
FIG. 14 is a conceptual data flow diagram illustrating a data flow between different components in an example apparatus, in accordance with various aspects of the present disclosure.

FIG. 14 is a conceptual data flow diagram 1400 illustrating a data flow between different components in an example apparatus 1402. The apparatus 1402 may be a UE (e.g., UE 120). In some aspects, the apparatus 1402 includes a reception component 1404, a determination component 1406, and/or a transmission component 1408.

The reception component 1404 may receive a signal from a BS 1450 (e.g., BS 110), such as a RMSI, a SIB, a RAR, and/or the like, based at least in part on an FH pattern and a set of FH channels. The determination component 1406 may determine that a signal, such as a PBCH/MIB or a SIB 1/RMSI, is associated with an NR-U Light configuration. The determination component 1406 may also determine the FH pattern and the set of FH channels. In some aspects, the determination component 1406 may determine the FH pattern and the set of FH channels by dividing a bandwidth of a base station that transmits the first signal into a plurality of contiguous channels. The transmission component 1408 may transmit data to the BS 1450, such as capability information for the apparatus 1402 indicating that the apparatus 1402 is an NR-U Light device, and/or the like.

The apparatus may include additional components that perform each of the blocks of the algorithm in the aforementioned process 1200 of FIG. 12 and/or the like. Each block in the aforementioned process 1200 of FIG. 12 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of components (e.g., one or more components) shown in FIG. 14 may perform one or more functions described as being performed by another set of components shown in FIG. 14.

Figure 15:
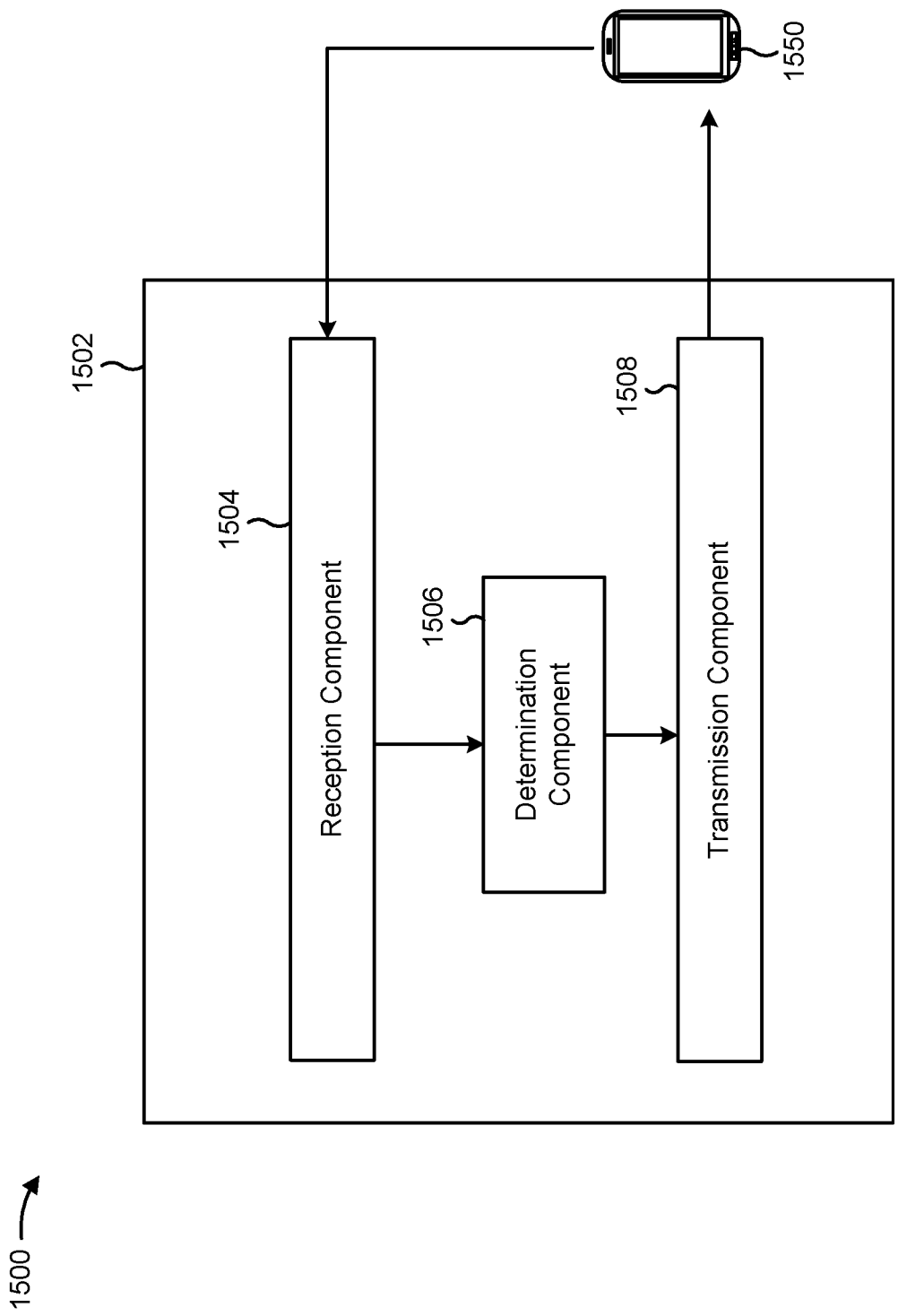
FIG. 15 is a conceptual data flow diagram illustrating a data flow between different components in an example apparatus, in accordance with various aspects of the present disclosure.

FIG. 15 is a conceptual data flow diagram 1500 illustrating a data flow between different components in an example apparatus 1502. The apparatus 1502 may be a base station (e.g., base station 110). In some aspects, the apparatus 1502 includes a reception component 1504, a determination component 1506, and/or a transmission component 1508.

The reception component 1504 may receive data from a UE 1550 (e.g., UE 120), such as capability information for the UE 1550 indicating that the UE 1550 is an NR-U Light device, and/or the like. The determination component 1506 may determine an FH pattern and a set of FH channels for an NR-U Light configuration for the UE 1550. The transmission component 1508 may transmit a first signal that is associated with an NR-U Light configuration (e.g., a RMSI or SSB) and a second signal, based at least in part on the FH pattern and the set of FH channels based at least in part on the first signal being associated with the NR-U Light configuration.

The apparatus may include additional components that perform each of the blocks of the algorithm in the aforementioned process 1300 of FIG. 13 and/or the like. Each block in the aforementioned process 1300 of FIG. 13 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of components (e.g., one or more components) shown in FIG. 15 may perform one or more functions described as being performed by another set of components shown in FIG. 15.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   determining that a first signal is associated with a New Radio Unlicensed (NR-U) Light configuration;
   determining a frequency hopping (FH) pattern and a set of FH channels for a second signal based at least in part on the determination that the first signal is associated with the NR-U Light configuration,
wherein the set of FH channels are included within a bandwidth of a control resource set (CORESET) with index zero; and
receiving the second signal based at least in part on the FH pattern and the set of FH channels.

2. The method of claim 1, wherein the first signal carries at least one of a master information block or a synchronization signal block and the second signal carries remaining minimum system information in the CORESET with index zero.

3. The method of claim 1, wherein the determination that the first signal is associated with the NR-U Light configuration is based at least in part on at least one of:
the first signal being on a synchronization raster associated with the NR-U Light configuration,
a value in the first signal indicating that the first signal is associated with the NR-U Light configuration, or
one or more codepoints of a table associated with the CORESET with index zero that is associated with the first signal.

4. The method of claim 1, wherein the set of FH channels is included within a wideband channel of a base station from which the first signal or the second signal is received.

5. The method of claim 1, wherein an initial FH channel location of the FH pattern is based at least in part on a frequency location and a bandwidth of the CORESET with a zero index.

6. The method of claim 1, wherein the FH pattern indicates that a first hop is performed after the first signal is received and before the second signal is received.

7. The method of claim 1, wherein determining the FH pattern and the set of FH channels for the second signal comprises:
dividing a bandwidth of a base station that transmits the first signal into a plurality of contiguous channels, wherein the set of FH channels corresponds to the plurality of contiguous channels, and wherein the first signal indicates a number of the plurality of contiguous channels.

8. The method of claim 7, wherein a CORESET indication of the first signal indicates the number of the plurality of contiguous channels and an FH channel offset that indicates a channel, of the plurality of contiguous channels, in which a synchronization signal block associated with the first signal is transmitted.

9. The method of claim 1, wherein the bandwidth of the CORESET with index zero, corresponding to the first signal, includes a center of a channel of the set of FH channels, wherein a bandwidth of the channel of the set of FH channels is sufficiently wide to carry the CORESET with index zero, and wherein the CORESET with index zero is a first CORESET with index zero corresponding to the first signal, and wherein the CORESET with index zero indicates an FH channel index corresponding to the channel.

10. The method of claim 1, wherein the FH pattern is determined based at least in part on at least one of timing information, a sub-band index associated with the first signal, or a cell identifier associated with the UE.

11. The method of claim 1, wherein determining the FH pattern is based at least in part on receiving information, via the first signal, indicating at least one of one or more hops associated with the second signal or a pattern offset relative to a configured pattern.

12. The method of claim 1, wherein a set of resource block (RB) offsets for a set of CORESETs with index zero, corresponding to the set of FH channels, is defined relative to an initial synchronization signal block (SSB) location of the first signal, wherein a particular CORESET with index zero is associated with a relative position, within an FH channel that includes the particular CORESET with index zero, that corresponds to a relative position of the initial SSB location of the first signal within another FH channel.

13. The method of claim 1, wherein the CORESET is a wideband CORESET with index zero, and wherein the set of FH channels correspond to respective groups of control channel elements (CCEs).

14. The method of claim 13, wherein, for a given hop identified by the FH pattern, a group of CCEs corresponding to an active FH channel are active, and wherein downlink control channel candidates are populated in the active group of CCEs.

15. The method of claim 14, wherein the FH pattern is based at least in part on at least one of a system frame number, a half frame index, or a sub-band index of the given hop.

16. The method of claim 14, wherein, for a common search space, the active group of CCEs for a given downlink control channel candidate is based at least in part on a number of CCEs associated with the wideband CORESET with index zero and an aggregation level of the given downlink control channel candidate.

17. The method of claim 13, wherein the bandwidth of the wideband CORESET with index zero is included in an NR Unlicensed band, and wherein a channel gap is provided between two or more FH channels of the set of FH channels, based at least in part on a number of symbols of the wideband CORESET with index zero.

18. The method of claim 13, wherein the first signal indicates the bandwidth of the wideband CORESET with index zero, and wherein the bandwidth of the wideband CORESET is equal to a number of the set of FH channels multiplied by a bandwidth of a single FH channel of the set of FH channels.

19. The method of claim 1, wherein the FH pattern is a first FH pattern, wherein the second signal indicates a second FH pattern for a third signal, and wherein the method further comprises:
transmitting or receiving the third signal in accordance with the second FH pattern, wherein the second signal indicates a plurality of resource block (RB) offsets for a plurality of FH channels associated with the second FH pattern, and wherein the second FH pattern is based at least in part on a pseudo-random hopping pattern that uses the plurality of RB offsets.

20. A method of wireless communication performed by a base station, comprising:
transmitting a first signal that is associated with a New Radio Unlicensed (NR-U) Light configuration; and
transmitting a second signal based at least in part on a frequency hopping (FH) pattern and a set of FH channels for the second signal based at least in part on the first signal being associated with the NR-U Light configuration,
wherein the set of FH channels are included within a bandwidth of a control resource set (CORESET) with index zero.

21. The method of claim 20, wherein the first signal carries at least one of a master information block or a synchronization signal block and the second signal carries remaining minimum system information in the CORESET with index zero.

22. The method of claim 20, wherein the first signal indicates that the first signal is associated with the NR-U Light configuration based at least in part on at least one of:
the first signal being on a synchronization raster associated with the NR-U Light configuration,
a value in the first signal indicating that the first signal is associated with the NR-U Light configuration, or
one or more codepoints of a table associated with the CORESET with index zero that is associated with the first signal.

23. The method of claim 20, wherein the set of FH channels is included within a wideband channel of the base station.

24. The method of claim 20, wherein an initial FH channel location of the FH pattern is based at least in part on a frequency location and a bandwidth of the CORESET with index zero.

25. The method of claim 20, wherein the FH pattern indicates that a first hop is performed after the first signal is received and before the second signal is received.

26. A user equipment (UE) for wireless communication, comprising:
a memory; and
one or more processors coupled to the memory, the one or more processors configured to:
determine that a first signal is associated with a New Radio Unlicensed (NR-U) Light configuration;
determine a frequency hopping (FH) pattern and a set of FH channels for a second signal based at least in part on the determination that the first signal is associated with the NR-U Light configuration,
wherein the set of FH channels are included within a bandwidth of a control resource set (CORESET) with index zero; and
receive the second signal based at least in part on the FH pattern and the set of FH channels.

27. The UE of claim 26, wherein the first signal carries at least one of a master information block or a synchronization signal block and the second signal carries remaining minimum system information in the CORESET with index zero.

28. The UE of claim 26, wherein the determination that the first signal is associated with the NR-U Light configuration is based at least in part on at least one of:
the first signal being on a synchronization raster associated with the NR-U Light configuration,
a value in the first signal indicating that the first signal is associated with the NR-U Light configuration, or
one or more codepoints of a table associated with the CORESET with index zero that is associated with the first signal.

29. The UE of claim 26, wherein the set of FH channels is included within a wideband channel of a base station from which the first signal or the second signal is received.

30. A base station for wireless communication, comprising:
a memory; and
one or more processors coupled to the memory, the one or more processors configured to:
transmit a first signal that is associated with a New Radio Unlicensed (NR-U) Light configuration; and
transmit a second signal based at least in part on a frequency hopping (FH) pattern and a set of FH channels for the second signal based at least in part on the first signal being associated with the NR-U Light configuration,
wherein the set of FH channels are included within a bandwidth of a control resource set (CORESET) with index zero.

\* \* \* \* \*